Jan. 2, 1962 P. E. PRITCHARD 3,015,703

STEREOPHONIC MAGNETIC PHONOGRAPH PICK-UP CARTRIDGE

Filed July 21, 1959

Inventor:
Peter E. Pritchard,
by Norman C. Fulmer
His Attorney.

United States Patent Office 3,015,703
Patented Jan. 2, 1962

3,015,703

STEREOPHONIC MAGNETIC PHONOGRAPH PICK-UP CARTRIDGE

Peter E. Pritchard, Skaneateles, N.Y., assignor to General Electric Company, a corporation of New York Filed July 21, 1959, Ser. No. 828,602
8 Claims. (Cl. 179—100.41)

This invention relates to magnetic phonograph pick-up cartridges of the variable reluctance type, used for reproducing sound signals from phonograph records, and the invention more particularly relates to a variable reluctance type of phonograph cartridge which can be used in connection with either monaural or stereophonic phonograph records.

The type of stereophonic phonograph record for which the invention is most readily suited, is the well-known type having a spiral sound groove of a generally V cross-sectional shape, the two signals of a stereophonic program being modulated respectively on the two side walls of the groove. The stylus of the pick-up cartridge simultaneously and continuously engages both of the side walls of the sound groove as the record is rotated, and the cartridge produces a pair of output signals which respectively represent the sound signals recorded on the two side walls of the sound groove. The construction of the pick-up cartridge of the present invention is generally similar to that disclosed in patent application, Serial No. 736,603, filed May 20, 1958, by the same inventor and assigned to the same assignee as the present invention. The present invention is an improvement over the aforesaid previously filed patent application, and constitutes a certain beneficial dimensional relationship of the magnetic pole pieces and the magnetic armature of the phonograph pick-up cartridge.

Objects of the present invention are to provide a stereophonic magnetic phonograph pick-up cartridge having improved frequency response, low distortion, high compliance, high signal output, and good electrical separation between the stereophonic signal channels. Other objects will be apparent.

In accordance with the present invention, a magnetic phonograph pick-up cartridge of the variable reluctance type is provided with a pair of magnetic pole pieces having the tips thereof spaced apart to provide a gap having a width of approximately 0.030 inch, it being necessary that the width of this air gap lie within the range of 0.030 inch, plus or minus 50%. An elongated armature of magnetic material, such as a ferromagnetic material or a metallic alloy capable of conducting magnetic flux, is positioned parallel to the length of the air gap and is aligned substantially symmetrically with respect to the tips of the pole pieces, and is spaced from these tips by a distance of approximately 0.016 inch, it being necessary that this spacing fall within the range of 0.016 inch, plus or minus 50%. The cross-sectional area of the armature is approximately 0.00050 sq. inch, and must lie in the range between 0.00025 sq. inch and 0.00075 sq. inch.

Figure 1:
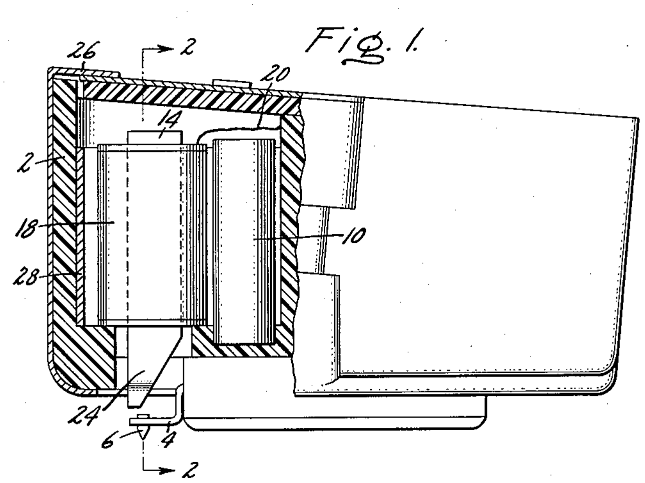
FIG. 1 is a view, partly broken away in longitudinal section, of a pick up cartridge constructed according to the present invention.
Figure 2:
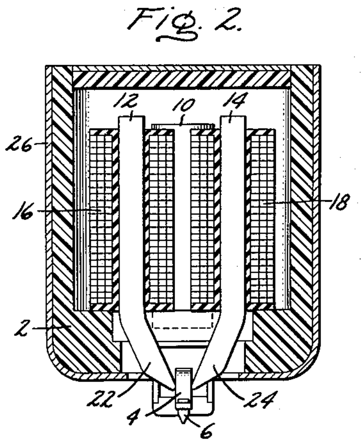
FIG. 2 is a transverse sectional view of the structure of FIG. 1 taken on the line 2—2 thereof.

Now referring to FIGS. 1 and 2, a pick-up cartridge in accordance with the present invention preferably includes a support or body 2 which may be of any suitable non-magnetic material such as molded plastic, and is adapted to be mounted at the end of a phonograph tone arm in any convenient or conventional manner.

The electromagnetic voltage generating system of the pick-up cartridge includes an armature 4 which may consist of a strip, tube, or rod of suitable magnetic material. The forward end of the armature 4 is spaced below the underside of the body 2, as shown in FIGS. 1 and 2, and carries a stylus 6 depending downwardly therefrom and having a generally conical extremity provided with a slightly rounded point adapted to engage the sound groove of a phonograph record. The armature 4 is mounted on the body 2 so that its forward end, which carries the stylus 6, is free to move in any direction, in a reference plane, from a neutral position corresponding to the position of the armature when the stylus is engaged in a record groove at a point of zero signal level. The aforesaid reference plane is indicated by the line 2—2 of FIG. 1, and may be defined as a plane approximately coincident with the plane that is normal to the tangent of the record sound groove at the point of engagement of the stylus therewith. However, as will be recognized by those skilled in the art, the exact position or angle of this reference plane may be permitted to vary slightly. Suitable damping means, not shown, may be provided to damp undesired vibrations of the armature at its resonant frequencies. The rearward end of the armature 4 may be attached to, or supported with respect to, the body 2 in any suitable manner.

Fixedly supported on the body 2 above the rearward end of the armature 4, is a permanent magnet 10 shown as having a generally cylindrical shape and disposed on the body 2 with its poles spaced along a generally upright or vertically extending axis. A pair of cores 12, 14 of ferromagnetic material (which may be laminated if desired) is arranged forwardly of the permanent magnet 10, the cores 12, 14 being arranged symmetrically with respect to the magnet 10 and the neutral position of the armature 4. Coils or solenoid windings 16, 18 are provided, respectively, on the cores 12, 14, the ends of the coils 16, 18 being connected by means of lead wires 20 to terminals (not shown) on the body 2.

Figures 3, 4:
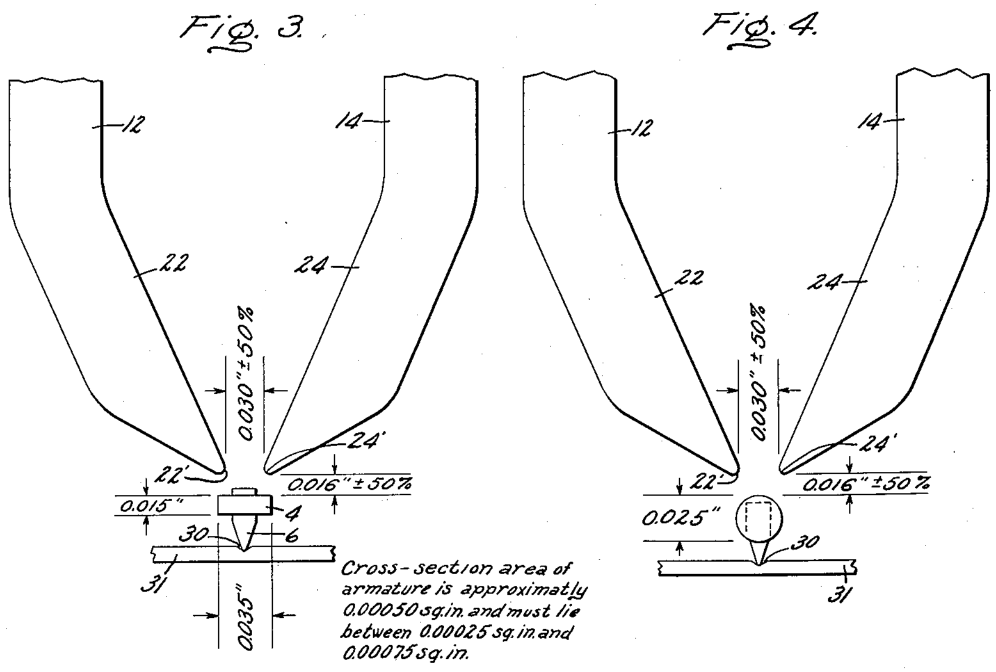
FIG. 3 is an enlarged view of a portion of the structure shown in FIG. 2.
FIG. 4 is an enlarged view of a portion of an alternative embodiment of the invention.

The lower ends of the cores 12, 14 are shaped to provide pole pieces 22, 24, which project slightly below the underside of the body 2, the ends of these pole pieces being symmetrically disposed, in the aforesaid reference plane, with respect to the neutral position of the stylus carrying portion of the armature 4. As shown in FIG. 3, the lower ends of the pole pieces 22, 24 are shaped to provide tips or edges 22′ and 24′ which are spaced apart to provide a gap therebetween, this spacing between the tips 22′ and 24′ of the pole pieces being approximately 0.030 inch or lying in the range of 0.030 inch, plus or minus 50%. The width of the gap defined by the tips 22′ and 24′ is, of course, equal to the spacing between these tips. The gap may be an air gap, or may contain non-magnetic material. Preferably the pole pieces 22, 24 are tapered toward their respective tips 22′, 24′, as shown. The armature 4 is spaced, in a symmetrical manner, below the pole piece tips 22′ and 24′ by a distance of approximately 0.016 inch, or by a distance falling in the range of 0.016 inch, plus or minus 50%. The aforesaid spacing between the pole piece tips 22′ and 24′ and the armature 4, is between the pole piece tips and the surface of the armature 4 that is nearest to the tips 22′, 24′.

The cross-sectional area of the armature 4 is approximately 0.00050 sq. inch, or in the range between 0.00025 sq. inch and 0.00075 sq. inch. The armature 4 shown in FIGS. 1, 2 and 3 has a rectangular cross-sectional shape, and preferably has dimensions of 0.035 inch wide (in a horizontal direction) and 0.015 inch thick (in the vertical direction). When the armature has a rectangular shape, its thickness must not be less than one-fourth of its width.

FIG. 4 illustrates a stylus-carrying armature 4 having a circular cross-sectional shape, the cross-sectional area thereof being as described above. A circular armature may have a diameter of 0.025 inch as shown in FIG. 4. In the embodiment of FIG. 4, and in accordance with the principles of the invention disclosed above, the tips 22' and 24' of the pole pieces 22 and 24 are spaced apart by a distance of 0.030 inch, plus or minus 50%, and the nearest surface of the armature 4 is spaced from the pole piece tips 22' and 24' by a distance of 0.016 inch, plus or minus 50%.

The above-disclosed critical spacing between the armature and the tips of the pole pieces is measured between the tips of the pole pieces and the nearest surface of the armature, as shown in the drawing, rather than between the pole piece tips and the geometrical center of the armature, for the reason that the nearest surface of the armature is the magnetically most effective part thereof insofar as the tips of the pole pieces are concerned.

The magnet 10, the armature 4, and the cores 12 and 14 along with their associated pole pieces 22 and 24, form a magnetic circuit in which (with suitable magnetic polarization of the magnet 10), magnetic flux generated by the magnet 10 extends downwardly from the bottom end thereof, through space to the armature 4, and lengthwise through the armature 4 to the forward end thereof at which the stylus 6 is located. The magnetic flux then separates into two portions, one portion going through air to the pole piece 22 at the region of the tip 22' thereof, and continuing upwardly through the core 12 to the top end thereof, and then through space to the top end of the magnet 10. Another portion of the magnetic flux from the forward end of the armature 4 extends through space to the pole piece 24 at the region of the tip 24' thereof, then extends upwardly through the core 14 to the upper end thereof, and then extends through space to the upper end of the magnet 10. Of course, an opposite polarization of the magnet 10 will cause the aforesaid directions of magnetic flux to be reversed; the functioning will be the same regardless of the polarization of the magnet 10.

In effect, two parallel magnetic circuits are provided through the cores 12 and 14. A change in the magnetic reluctance of the path of the magnetic flux which goes through either or both of the cores 12 and 14, will cause generation of electrical signals in either or both of the coils 16 and 18, in a well-known manner. Movement of the armature 4, caused by the stylus 6 being in engagement with the modulated groove 30 of a phonograph record 31, will cause a change in reluctance of the magnetic path of one or both of the cores 12, 14 and their associated pole pieces 22, 24, as will be described more fully hereafter.

Now particularly considering FIG. 3 of the drawing, or the alternatve embodiment shown in FIG. 4, the groove 30 of the stereophonic phonograph record 31 is a conventional V shaped groove, in which the left-hand side wall thereof has been modulated in accordance with one channel of a stereophonic program, and in which the right-hand side wall thereof has been modulated in accordance with another channel of a stereophonic program. The modulation of the left-side wall of the groove 30 will cause the armature 4 to vibrate in a direction from lower left to upper right, and vice versa, and this vibration will cause a change in the reluctance of the magnetic circuit of core 14, and hence a corresponding output signal will be generated in coil 18, since the armature 4 will be varying its spacing from the tip 24'; however, such a vibration of an armature as caused by the left-side wall of the groove 30, will have substantially no effect on the reluctance of the magnetic circuit of the core 12, since the armature 4 will remain at substantially the same spacing from the tip 22' of the core 12 due to the configuration and the dimensions of the assembly, and hence, the modulation of the left-side wall of the groove 30 will not cause any signal to be generated in the coil 16 which is associated with the core 12.

Similarly, modulations of the right-hand side wall of the groove 30 will cause the armature to vibrate back and forth in a direction from upper left to lower right, and vice versa, thereby varying the spacing between the armature 4 and pole tip 22' and affecting the reluctance of the magnetic circuit of core 12 and thus generating a corresponding electrical signal in the coil 16. However, vibrations of the stylus in accordance with modulations of the right-hand side wall of the groove 30 will not substantially affect the spacing between the armature 4 and the tip 24' of core 14, and hence will not substantially affect the reluctance of the magnetic circuit of core 14 and therefore will not generate any electrical signal in the coil 18.

If desired, the phonograph record 31 may be a monaural type of phonograph record, in which case the armature 4 will be vibrated back and forth in a horizontal direction by the recorded modulation of the groove 30 which is engaged by the stylus 6. This horizontal vibration of the armature 4 will cause equal signals, of opposite polarity, to be generated in the coils 16 and 18, because a horizontal movement of the armature 4 will cause equal magnitude, but opposite polarity, changes of reluctance in the magnetic circuits of the cores 12 and 14. The signals thus generated in the coils 16 and 18, can be combined in an additive manner to provide a single output signal.

It will be noted that air gaps are provided between the upper end of the magnet 10 and the upper ends of the cores 12 and 14, and an air gap also is provided between the lower end of the magnet 10 and the armature 4. These air gaps are purposely provided, since it is found that it is desirable to provide a certain amount of air gap in the magnetic circuit in order to achieve good fidelity and low distortion. Furthermore, it is necessary to space the magnet 10 away from the cores 12 and 14 by a certain amount, so as to prevent or deter stray flux of the magnet 10 from flowing directly through the cores 12, 14 and their associated pole pieces 22, 24, thereby undesirably by-passing the armature 4. Preferably, the magnet is spaced from the cores 12, 14 by a sufficient gap of air or other low permeability material so that the density of leakage flux extending directly from the magnet 10 through the pole pieces 22, 24, will be less than 20% of the magnetic flux which, in the desired manner, flows from the magnet 10 through the armature 4 and hence through the cores 12, 14 and their associated pole pieces 22, 24. Suitable magnetic shielding 26, 28 may be provided to reduce any effects of external magentic fields.

Contrary to what might be expected, and in accordance with the present invention, it is found that certain dimensions are critical for optimum performance. The dimensioning of the air gap between the pole piece tips 22' and 24', the spacing between these pole piece tips and the upper surface of the armature 4, and the cross-sectional area of the armature 4, from a critical combination, and these dimensions must have suitable values, as disclosed above, in order to obtain the optimum performance of which the structural arrangement is capable. If the cross-sectional size of the armature is reduced below the range of values disclosed herein, it is found that the magnitude of the output signals becomes undesirably reduced. If the cross-sectional size of the armature is increased beyond the range of values disclosed herein, it is found that the high-frequency response is adversely affected. A deviation beyond the disclosed range of values in the spacing between the tips of the pole pieces, or in the spacing from the armature to the tips of the pole pieces, will result in distortion and poor electrical separation between the stereophonic signal channels.

While preferred embodiments of the invention have been disclosed, alternative embodiments and modifications thereof will be apparent to one skilled in the art, and will fall within the scope of invention as defined by the following claims.

What I claim as new and desire to secure by Letters Patent of the United States is:

1. A phonograph pick-up cartridge having a pair of pole pieces each having a tip, said pole pieces being arranged so that the tips thereof are spaced apart to provide a gap having a width of approximately 0.030 inch, and an elongated armature of magnetic material positioned substantially parallel to the length of said air gap and aligned substantially symmetrically with respect to the tips of said pole pieces, said armature having a neutral position and being movable from said neutral position in all directions in a plane substantially perpendicular to the axis of said armature, said armature being spaced a distance of approximately 0.016 inch from a plane passing through the tips of said pole pieces, said armature having a cross-sectional area of approximately 0.00050 sq. inch, and the thinnest dimension of said cross-sectional area of the armature being no less than one-fourth of the widest dimension thereof.

2. A phonograph pick-up cartridge as claimed in claim 1, in which said armature has a rectangular cross-sectional area.

3. A phonograph pick-up cartridge as claimed in claim 1, in which said armature has a circular cross-sectional area.

4. A phonograph pick-up cartridge as claimed in claim 1 in which said pole pieces are inclined toward each other, and in which each of said pole pieces is tapered towards the tip thereof.

5. A phonograph pick-up cartridge comprising a pair of pole pieces each having a tip, said pole pieces being arranged so that said tips thereof are spaced apart a distance of 0.030 inch plus or minus 50% thereby defining a gap having a width extending between said tips, and an elongated armature of magnetic material positioned substantially parallel to the length of said air gap and aligned substantially symmetrically with respect to the tips of said pole pieces, said armature having a neutral position and being movable from said neutral position in all directions in a plane substantially perpendicular to the axis of said armature, said armature being spaced a distance of 0.016 inch plus or minus 50% from a plane extending through said tips, said armature having a cross-sectional area lying in the range between 0.00025 sq. inch and 0.00075 sq. inch, the thinnest dimension of said cross-sectional area being no less than one-fourth of the widest dimension thereof.

6. A phonograph pick-up cartridge as claimed in claim 5, in which said armature has a rectangular cross-sectional area.

7. A phonograph pick-up cartridge as claimed in claim 5, in which said armature has a circular cross-sectional area.

8. A phonograph pick-up cartridge as claimed in claim 5, in which said pole pieces are inclined toward each other, and in which each of said pole pieces is tapered towards the tip thereof.

References Cited in the file of this patent

UNITED STATES PATENTS

| | | |
|---|---|---|
| 2,485,432 | Cornwell | Oct. 18, 1949 |
| 2,639,156 | Ward | May 19, 1953 |
| 2,864,897 | Kaar | Dec. 16, 1958 |